(12) United States Patent
Ujimoto et al.

(10) Patent No.: US 8,232,486 B2
(45) Date of Patent: Jul. 31, 2012

(54) POWER SEAT CONTROL UNIT

(75) Inventors: Takushi Ujimoto, Fuchu-cho (JP);
Hiroshi Nakahira, Fuchu-cho (JP);
Hiroshi Shimase, Fuchu-cho (JP);
Tomohiro Kawasaki, Fuchu-cho (JP);
Yuuki Kihara, Fuchu-cho (JP)

(73) Assignee: Delta Kogyo Co., Ltd. (JP)

( * ) Notice: Subject to any disclaimer, the term of this patent is extended or adjusted under 35 U.S.C. 154(b) by 420 days.

(21) Appl. No.: 12/697,467

(22) Filed: Feb. 1, 2010

(65) Prior Publication Data

US 2010/0193340 A1    Aug. 5, 2010

(30) Foreign Application Priority Data

Feb. 5, 2009   (JP) .................................. 2009-24492

(51) Int. Cl.
*H01H 9/26* (2006.01)
*H01H 13/72* (2006.01)
*H01H 13/76* (2006.01)
(52) U.S. Cl. ........................................ 200/5 R; 200/339
(58) Field of Classification Search .................. 200/339
See application file for complete search history.

(56) References Cited

U.S. PATENT DOCUMENTS

| 4,394,546 | A | 7/1983 | Harumatsu |
| 5,140,235 | A * | 8/1992 | Ahmed et al. ................ 318/286 |
| 6,340,800 | B1 | 1/2002 | Zhai et al. |
| 2006/0243566 | A1 | 11/2006 | Sakai |
| 2008/0012413 | A1 | 1/2008 | Schneiss et al. |

FOREIGN PATENT DOCUMENTS

| DE | 100 12 758 | 9/2001 |
| EP | 1 659 020 | 5/2006 |
| EP | 1 717 094 | 11/2006 |
| JP | 9-22642 | 1/1997 |
| JP | 2006-88718 | 4/2006 |

* cited by examiner

*Primary Examiner* — Renee Luebke
*Assistant Examiner* — Lheiren Mae Caroc
(74) *Attorney, Agent, or Firm* — Gerald E. Hespos; Michael J. Porco

(57) ABSTRACT

A power seat control unit has a dial-type switch, a seesaw-type switch and button-type switches. The dial-type switch is ring-shaped, and allows a seat occupant to perform frontward and rearward inclining adjustments of a seat back of a power seat depending on a rotation direction thereof. The seesaw-type switch is inward of the dial-type switch and across a center of the dial-type switch and allows the seat occupant to perform a frontward and rearward displacement adjustments of the seat depending on a pushed position. The button-type switches are inward of the dial-type switch and on both sides of the seesaw-type switch, and allow the seat occupant to perform tilt-up and tilt-down adjustments of a front portion of a seat cushion and lift-up and lift-down adjustments of a rear portion of the seat cushion depending on which button-type manual switch is pushed.

4 Claims, 7 Drawing Sheets

POWER SEAT CONTROL UNIT

BACKGROUND OF THE INVENTION

1. Field of the Invention

The present invention relates to a power seat control unit.

2. Description of the Related Art

Generally, a power seat is designed to allow a user or a seat occupant to perform a frontward-rearward slide adjustment of the seat, an upward-downward displacement adjustment (tilt adjustment) of a front portion of the seat, an upward-downward displacement adjustment (lift adjustment) of a rear portion of the seat, and a frontward-rearward inclining adjustment (reclining adjustment) of a seat back, through the use of an actuator, such as an electric motor. There is also a particular type of power seat designed to allow a seat occupant to perform a frontward-rearward displacement adjustment of a lumber support of a seat back and an upward-downward displacement adjustment of a headrest, in addition to the above typical adjustments. The upward-downward displacement adjustment of the front portion of the seat, the upward-downward displacement adjustment of the rear portion of the seat, and an upward-downward displacement adjustment of the entirety of the seat may be referred to respectively as "front tilt adjustment", "rear tilt adjustment" and "lift adjustment", on a case-by-case basis.

In the above power seats, each of the adjustments is performed by manual operation of a switch. For example, a power seat disclosed in JP 2006-88718A is designed to allow a seat occupant to perform a reclining adjustment of a seat back, a frontward-rearward slide adjustment of the seat, and a height adjustment of the seat, by a manual operation of rotating a single manual operation dial, a manual operation of slidingly moving the dial in a frontward-rearward direction, and a manual operation of slidingly moving the dial in an upward-rearward direction, respectively.

In the power seat disclosed in JP 2006-88718A, an adjustment for displacing the seat upwardly while slidingly displacing the seat frontwardly, and an adjustment for displacing the seat downwardly while slidingly displacing the seat frontwardly can also be performed by a manual operation of slidingly moving the dial frontwardly and obliquely upwardly, and a manual operation of slidingly moving the dial frontwardly and obliquely downwardly, respectively. Further, an adjustment for displacing the seat upwardly while slidingly displacing the seat rearwardly, and an adjustment for displacing the seat downwardly while slidingly displacing the seat rearwardly, can be performed by a manual operation of slidingly moving the dial rearwardly and obliquely upwardly, and a manual operation of slidingly moving the dial rearwardly and obliquely downwardly, respectively.

JP 9-22642A discloses a power seat designed to allow a seat occupant to perform a frontward-rearward slide adjustment of the seat, a height adjustment of the seat, a front tilt adjustment of the seat, and a rear tilt adjustment of the seat, by a manual operation of slidingly moving a single dial in a frontward-rearward direction, a manual operation of slidingly moving the dial in an upward-downward direction, a manual operation of rotating the dial in a clockwise direction, and a manual operation of rotating the dial in a counterclockwise direction, respectively.

In cases where a power seat as disclosed in the above patent publications is used in a passenger car (vehicle), particularly in a family car (private vehicle), a seating position of each passenger or seat occupant is almost fixed. Thus, the slide, tilt and lift adjustments is performed only occasionally. In contrast, the reclining adjustment, such as an operation of largely inclining a seat back rearwardly to relax during a rest stop and then retuning the seat back to its original position, is performed relatively frequently.

In both the power seats disclosed in the above patent publications, each of the adjustments is performed by a corresponding one of the manual operations of rotating and/or slidingly moving the single dial. Thus, a user is likely to be confused in choosing an intended one of the manual operations, which causes a problem, for example, that the user erroneously performs the manual operation for the slide, tilt or lift adjustment, instead of the manual operation for the reclining adjustment.

SUMMARY OF THE INVENTION

It is an object of the present invention to provide a power seat control unit capable of solving the above problem.

It is another object of the present invention to clearly sectionalize a manual operation section into a section for a reclining adjustment which is performed relatively frequently, and a section for a slide, tilt and lift adjustments which are performed only occasionally, so as to enhance operationality of the reclining adjustment which is performed relatively frequently.

In order to achieve the above objects, according to one aspect of the present invention, there is provided a power seat control unit for allowing a seat occupant to perform reclining, slide, tilt and lift adjustments of a power seat. The power seat control unit comprises a dial-type manual operation switch knob for the reclining adjustment, a seesaw-type manual operation switch knob for the slide adjustment, and a plurality of button-type manual operation switch knobs for the tilt and lift adjustments. The dial-type manual operation switch knob is formed in a ring shape, and adapted to allow the seat occupant to selectively perform a frontward inclining adjustment and a rearward inclining adjustment of a seat back of the seat, depending on a rotation direction thereof. The seesaw-type manual operation switch knob is disposed on an inward side of the dial-type manual operation switch knob and across a center of the dial-type manual operation switch knob, and adapted to allow the seat occupant to selectively perform a frontward displacement adjustment and a rearward displacement adjustment of the seat, depending on a pushed position thereof. Further, the plurality of button-type manual operation switch knobs are disposed on the inward side of the dial-type manual operation switch knob and on both sides of and across the seesaw-type manual operation switch knob, and adapted to allow the seat occupant to selectively perform a tilt-up adjustment and a tilt-down adjustment of a front portion of a seat cushion of the seat, and a lift-up adjustment and a lift-down adjustment of a rear portion of the seat cushion, depending on which of the button-type manual operation switch knobs is pushed.

DETAILED DESCRIPTION OF THE PREFERRED EMBODIMENTS OF THE INVENTION

With reference to the drawings, the present invention will now be specifically described based on an embodiment thereof.

Figure 7:
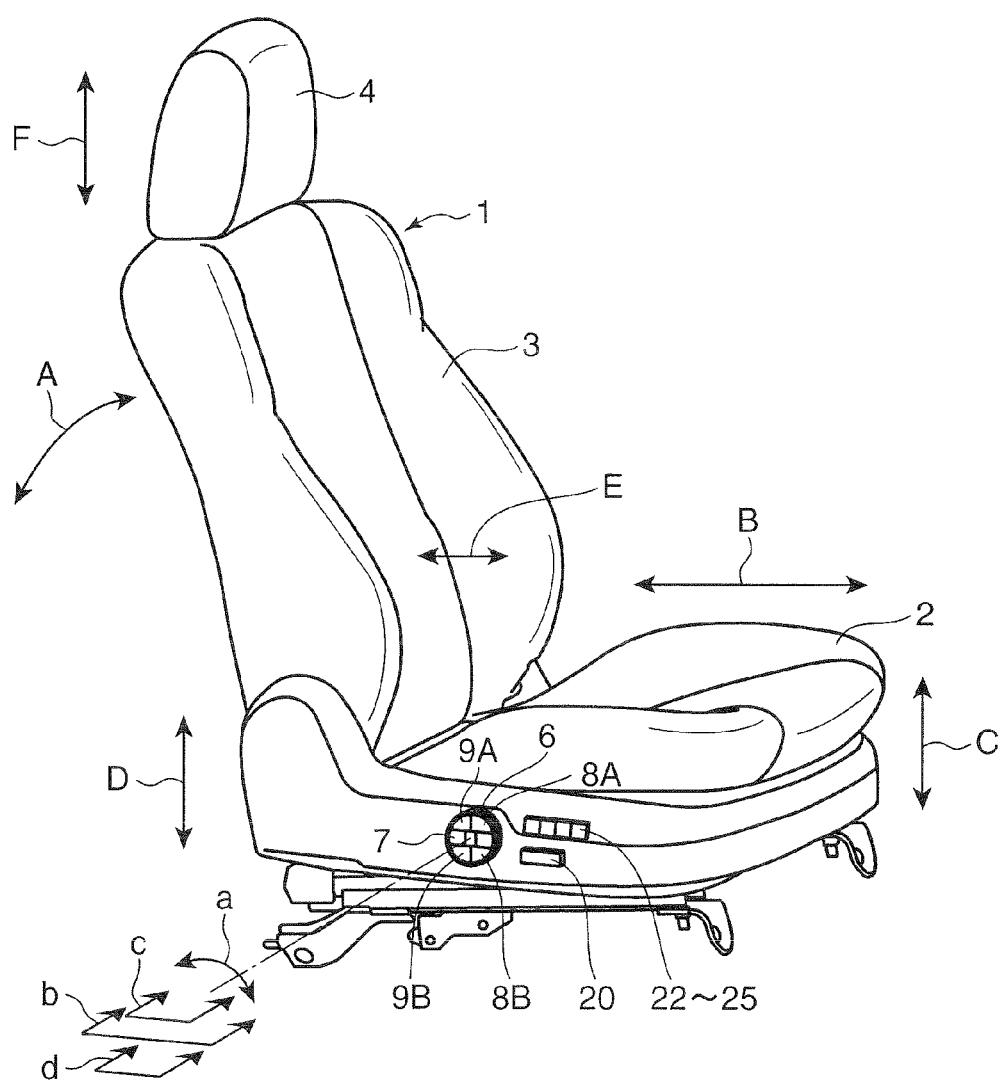
FIG. 7 is a perspective view of a power seat equipped with the power seat control unit according to the embodiment.

FIG. 7 is a perspective view of an automobile power seat equipped with a power seat control unit according to one embodiment of the present invention. The power seat 1 is provided with an actuator, such as an electric motor (not shown), and adapted to allow a seat occupant to perform a frontward-rearward inclining (reclining) adjustment of a seat back 3 (see the arrowed line A) and a frontward-rearward slide adjustment of the seat 1 (see the arrowed line B), according to driving of the actuator.

The power seat 1 is also adapted to allow the seat occupant to perform an upward-downward displacement (tilt) adjustment of a front portion of a seat cushion 2 (see the arrowed line C) and an upward-downward displacement (lift) adjustment of a rear portion of the seat cushion 2 (see the arrowed line D). Further, the power seat 1 is adapted to allow the seat occupant to perform a frontward-rearward displacement adjustment of a lumber support of the seat back 3 (see the arrowed line E) and an upward-downward displacement adjustment of a headrest 4 (see the arrowed line F).

The power seat 1 is equipped with a dial-type manual operation switch knob 6 for the reclining adjustment, a seesaw-type manual operation switch knob 7 for the slide adjustment, two button-type manual operation switch knobs 8A, 8B for the tilt adjustment, and two button-type manual operation switch knobs 9A, 9B for the lift adjustment.

When the dial-type manual operation switch knob 6 is manually rotated in the direction indicated by the arrowed line a, the seat back 3 is inclined in a frontward-rearward direction (the direction indicated by the arrowed line A) to undergo the reclining adjustment.

When the seesaw-type manual operation switch knob 7 is manually pushed (the pushing direction is indicated by the arrowed line b), the entirety of the seat 1 is slidingly displaced a frontward-rearward direction (the direction indicated by the arrowed line B) to undergo the slide adjustment.

When the button-type manual operation switch knob 8A (8B) is manually pushed (the pushing direction is indicated by the arrowed line c), the front portion of the seat cushion 2 is displaced in an upward (downward) direction (the direction indicated by the arrowed line C) to undergo the tilt adjustment.

When the button-type manual operation switch knob 9A (9B) is manually pushed (the pushing direction is indicated by the arrowed line d), the rear portion of the seat cushion 2 is displaced in an upward (downward) direction (the direction indicated by the arrowed line D) to undergo the lift adjustment.

As shown in FIGS. 1A to 6, a power seat control unit for the power seat 1 comprises a switch installation box 10. The switch installation box 10 includes a horizontally-long rectangular-parallelepiped box-shaped box body 11 having an open lower surface, and a bottom cover 12 closing the lower surface of the box body 11.

Figure 3A:
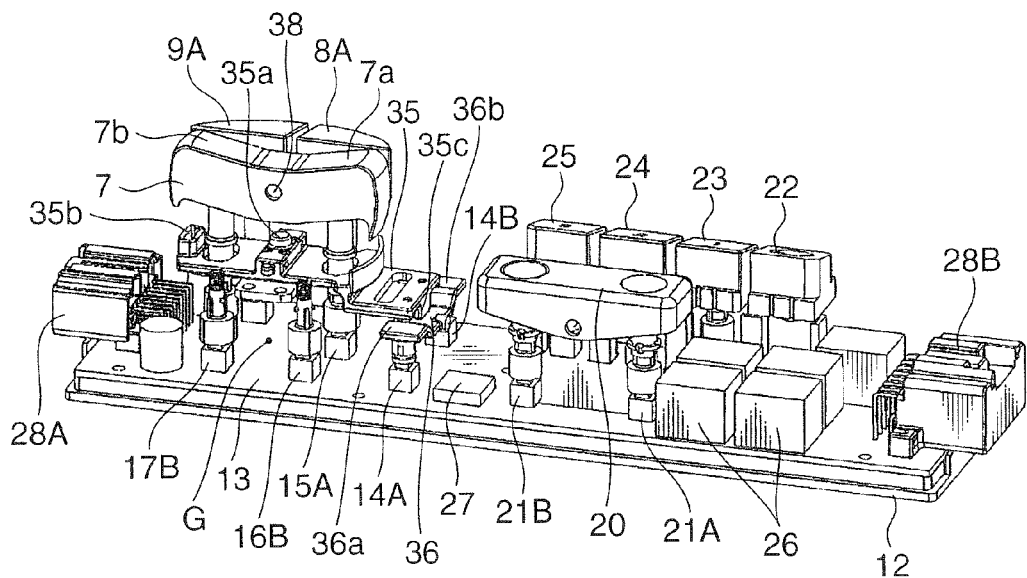
FIG. 3A is a perspective view of a printed-circuit board provided in the power seat control unit in FIG. 1A.
Figure 3B:
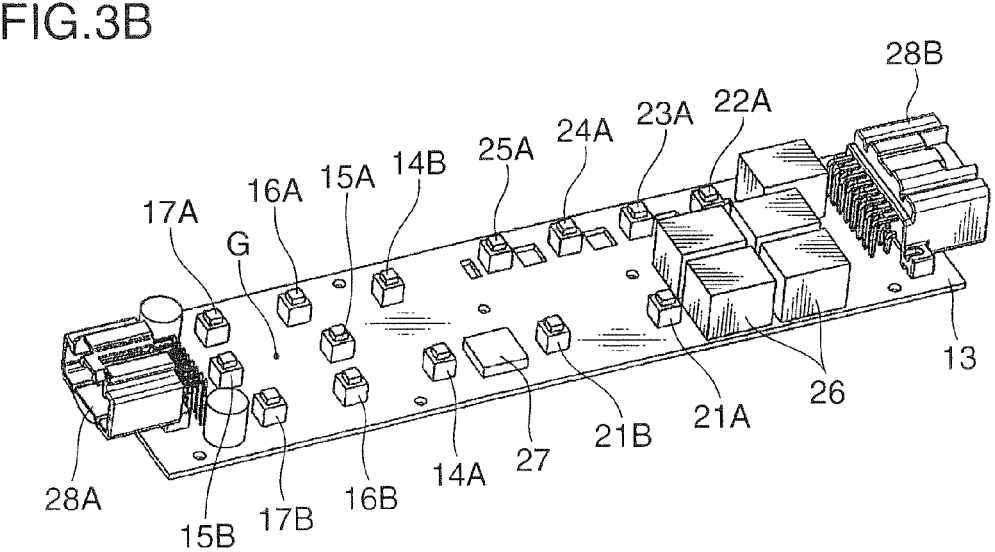
FIG. 3B is a perspective view of the printed-circuit board, wherein a manual operation switch knob assembly is removed therefrom.
Figure 4A:
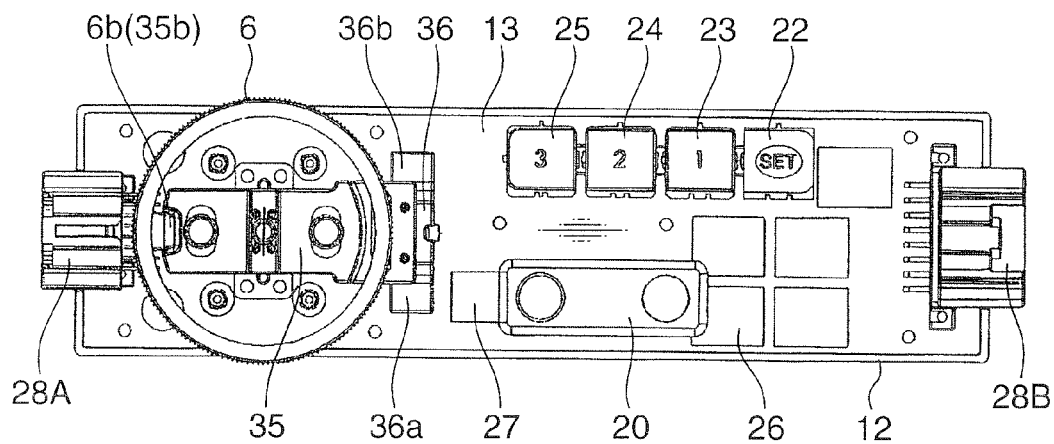
FIG. 4A is a top plan view of the power seat control unit, wherein a box body is removed from the power seat control unit in FIG. 1A.
Figure 4B:
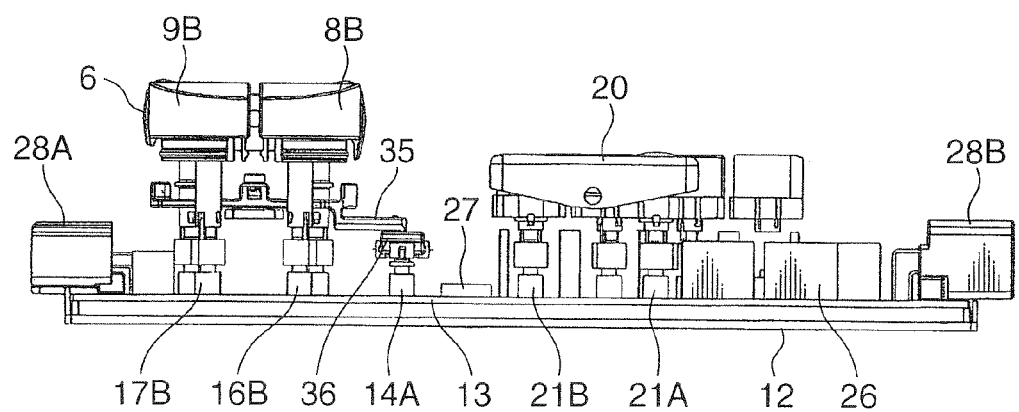
FIG. 4B is a front view of the power seat control unit in FIG. 1A.

The bottom cover 12 has a printed-circuit board 13 provided on an inner surface thereof to mount thereon control components and others. As shown in FIGS. 3A and 3B in detail, the printed-circuit board 13 is provided with a push switch 15A for a frontward displacement adjustment of the seat 1, which is adapted to be turned on in response to a manual operation of pushing a front portion 7a of the seesaw-type manual operation switch knob 7, and a push switch 15B for a rearward displacement adjustment of the seat 1, which is adapted to be turned on in response to a manual operation of pushing a rear portion 7b of the seesaw-type manual operation switch knob 7. The push switch 15A and the push switch 15B are disposed at respective positions which are symmetrical with respect to a center G of the dial-type manual operation switch knob 6.

The printed-circuit board 13 is further provided with a push switch 16A for a tilt-up adjustment of the front portion of the seat cushion 2, which is adapted to be turned on in response to a manual operation of pushing the button-type manual operation switch knob 8A, and a push switch 16B for a tilt-down adjustment of the front portion of the seat cushion 2, which is adapted to be turned on in response to a manual operation of pushing the button-type manual operation switch knob 8B.

The printed-circuit board 13 is further provided with a push switch 17A for a lift-up adjustment of the rear portion of the seat cushion 2, which is adapted to be turned on in response to a manual operation of pushing the button-type manual operation switch knob 9A, and a push switch 17B for a lift-down adjustment of the rear portion of the seat cushion 2, which is adapted to be turned on in response to a manual operation of pushing the button-type manual operation switch knob 9B.

The printed-circuit board 13 is further provided with a push switch 14A for a frontward inclining adjustment of the seat back 3, and a push switch 14B for a rearward inclining adjustment of the seat back 3, at respective positions slightly away from the center G of the dial-type manual operation switch knob 6 with respect to the push switches 15A, 16A, 16B. The push switch 14A is adapted to be turned on in response to a manual operation of rotating the dial-type manual operation switch knob 6 in a first rotation direction (normal direction or clockwise direction) thereof, and the push switch 14B is adapted to be turned on in response to a manual operation of rotating the dial-type manual operation switch knob 6 in a second rotation direction (reverse direction or counterclockwise direction) thereof. The push switches 14A, 14B are disposed at respective positions equally distant from the center G of the dial-type manual operation switch knob 6.

The printed-circuit board 13 is further provided with two push switches 21A, 21B for the frontward-rearward displacement adjustment of the lumber support of the seat back 3, each of which is adapted to be turned on in response to a manual operation of a seesaw-type manual operation switch knob 20 (see FIGS. 1A to 2A). The seesaw-type manual operation switch knob 20 is a switch knob for allowing the lumber support of the seat back 3 to be displaced in a frontward-rearward direction (the direction indicated by the arrowed line E in FIG. 7) so as to adjust a position of the lumber support. The printed-circuit board 13 is further provided with a plurality of push switches 22A to 25A which are adapted to be turned on in response to a manual operation of corresponding ones of a plurality of manual operation buttons 22 to 25 (see FIGS. 1A to 2A). Each of the manual operation buttons 22 to 25 is operated when a seat occupant wants to store data, such as a slide position of the seat 1.

Further, the printed-circuit board 13 is provided with a relay 26, a buzzer 27, two connectors 28A, 28B and other components. Signal information from the push switch 14A and other push switches is sent to a control circuit for controlling the actuator, and others, through a wiring member connected to each of the connectors 28A, 28B.

Figure 5:
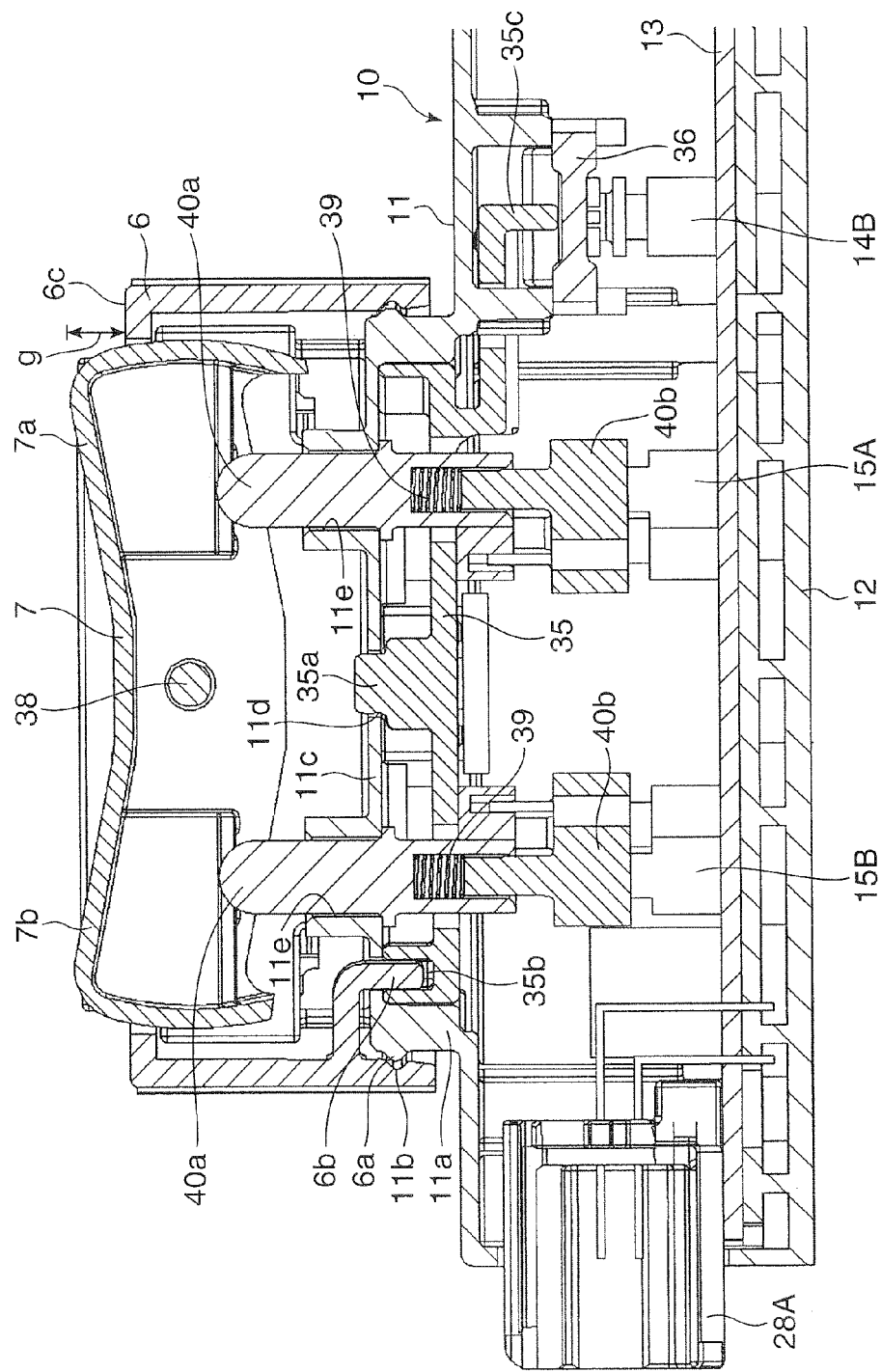
FIG. 5 is a sectional view taken along the line V-V in FIG. 1B.
Figure 6:
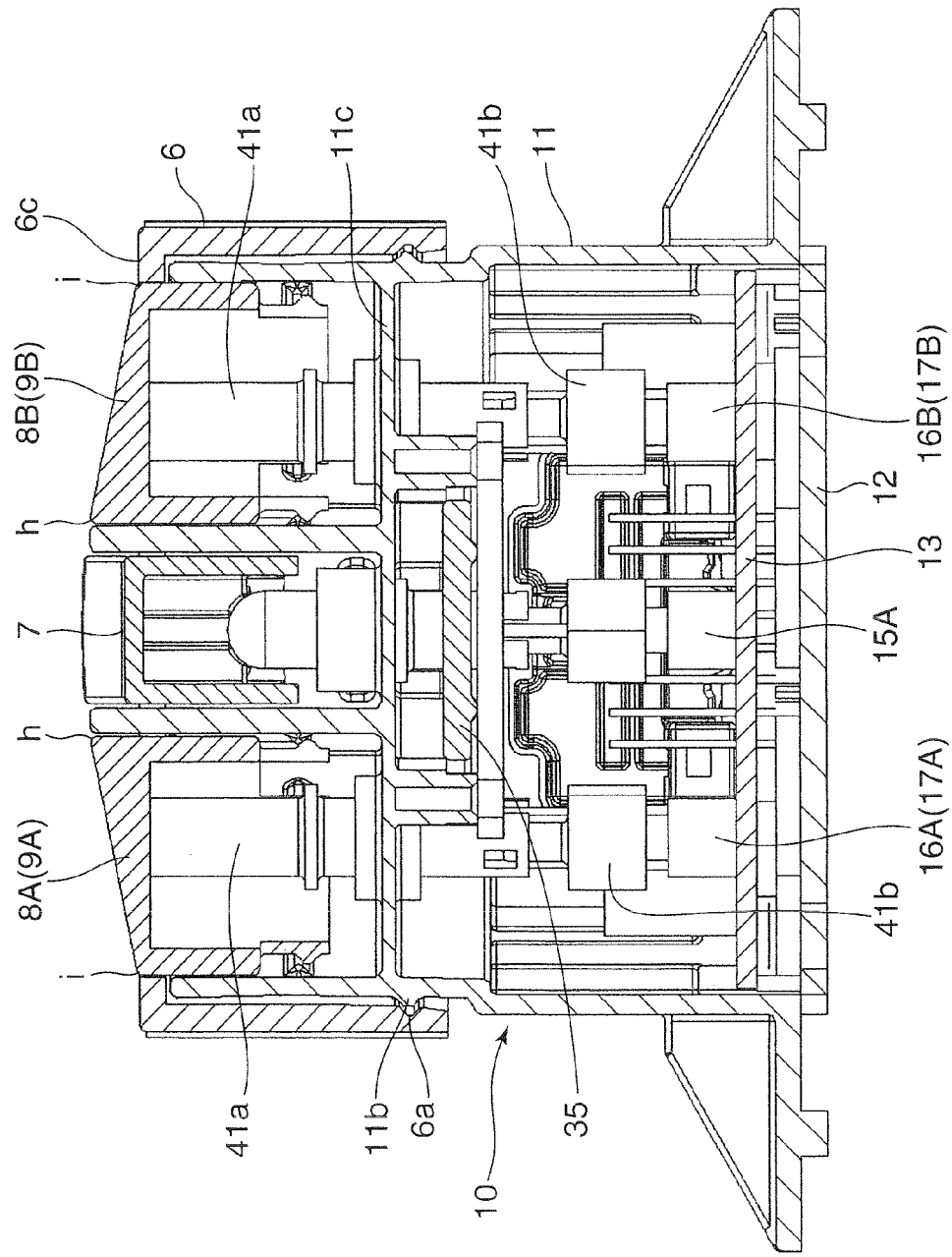
FIG. 6 is a sectional view taken along the line VI-VI in FIG. 1B.

As shown in FIGS. 5 and 6 in detail, the ring (or cylindrical)-shaped dial-type manual operation switch knob 6 is installed above an upper surface of the box body 11. Specifically, the box body 11 has a ring-shaped convex portion 11a formed to protrude upwardly from the upper surface of the box body 11, and a lower portion of the dial-type manual operation switch knob 6 is fitted on the ring-shaped convex portion 11a. More specifically, an inner peripheral groove 6a formed in an inner peripheral surface of the dial-type manual operation switch knob 6 is engaged with an outer peripheral protrusion 11b formed on an outer peripheral surface of the ring-shaped convex portion 11a, so that the dial-type manual operation switch knob 6 is held by the box body 11 rotatably and non-disengageably with respect to the ring-shaped convex portion 11a.

A turnable plate 35 is provided on an inward side of the ring-shaped convex portion 11a of the box body 11. The turnable plate 35 is disposed under a top plate portion 11c of the box body 11 formed to be bridged across a top end of the ring-shaped convex portion 11a. The turnable plate 35 has a shaft portion 35a which is fitted in a central hole 11d of the top plate portion 11c. In this manner, the turnable plate 35 is supported by the top plate portion 11c turnably in a horizontal plane.

The turnable plate 35 has a unidirectionally elongated-shaped body. The body of the turnable plate 35 has one end formed with a concave portion 35b as a groove opened upwardly. The concave portion 35b engagedly receives therein a distal end of a downwardly-extending protrusion 6b formed on the inner peripheral surface of the dial-type manual operation switch knob 6. The turnable plate 35 also has a lower piece 35c formed to protrude downwardly from the other end of the body thereof. As also shown in FIG. 3A, the lower piece 35c is disposed at a position just above a region between the push switches 14A, 14B. A swing plate 36 is disposed to ride on the respective push switches 14A, 14B. Specifically, the swing plate 36 is formed by subjecting a plate-shaped member to bending work to have a central portion protruding downwardly, a first end portion 36a connected to one edge of the central portion and inclined downwardly toward the central portion, and a second end portion 36b connected to the other edge of the central portion and inclined downwardly toward the central portion.

When the dial-type manual operation switch knob 6 is manually rotated in the first direction (clockwise direction), the turnable plate 35 is also turned in the first direction through the downwardly-extending protrusion 6b and the concave portion 35b. Thus, the lower piece 35c of the turnable plate 35 pushes the first end portion 36a of the swing plate 36 downwardly. Thus, the push switch 14A for the frontward inclining adjustment is turned on, so that the seat back 3 is inclined frontwardly according to driving of the actuator. When the dial-type manual operation switch knob 6 is manually rotated in the second direction (counterclockwise direction), the turnable plate 35 is also turned in the second direction, and the lower piece 35c pushes the second end portion 36b of the swing plate 36 downwardly. Thus, the push switch 14B for the rearward inclining adjustment is turned on, so that the seat back 3 is inclined rearwardly according to driving of the actuator.

The seesaw-type manual operation switch knob 7 is disposed on an inward side of the dial-type manual operation switch knob 6. The seesaw-type manual operation switch knob 7 is supported swingably in an upward-downward direction, by a pin 38 extending horizontally at a position across a center of the seesaw-type manual operation switch knob 7. As shown in FIG. 5, the seesaw-type manual operation switch knob 7 has a central portion located just above the pin 38, a front portion 7a extending frontwardly from the central portion, and a rear portion 7b extending rearwardly from the central portion. The front portion 7a is disposed just above the push switch 15A for the frontward displacement adjustment. Further, a lower connection member 40b, and an upper connection member 40a coupled to the lower connection member 40b and biased upwardly by a spring 39, are disposed between the front portion 7a and the push switch 15A. In the same manner, an upper connection member 40a and a lower connection member 40b are disposed between the rear portion 7b and the push switch 15B for the rearward displacement adjustment. Each of the upper connection members 40a is inserted into a guide hole 11e of the top plate portion 11c of the ring-shaped convex portion 11a, in such a manner that it is moved upwardly and downwardly while being guided by the guide hole 11e.

When the front portion 7a is manually pushed, the seesaw-type manual operation switch knob 7 is swingingly moved about the pin 38, and the push switch 15A for the frontward displacement adjustment is turned on through the connection members 40a, 40b, etc. Thus, the actuator is driven to displace the seat 1 frontwardly. When the rear portion 7b of the seesaw-type manual operation switch knob 7 is manually pushed, the push switch 15B for the rearward displacement adjustment is turned on through the connection members 40a, 40b, etc. Thus, the actuator is driven to displace the seat 1 rearwardly.

Figure 1A:
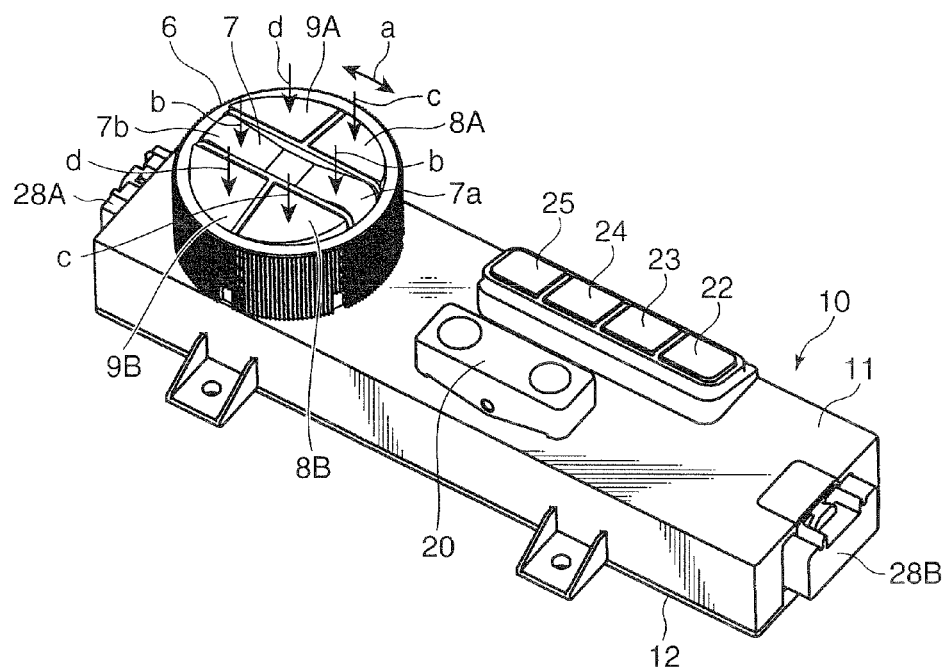
FIG. 1A is a perspective view of a power seat control unit according to one embodiment of the present invention.
Figure 1B:
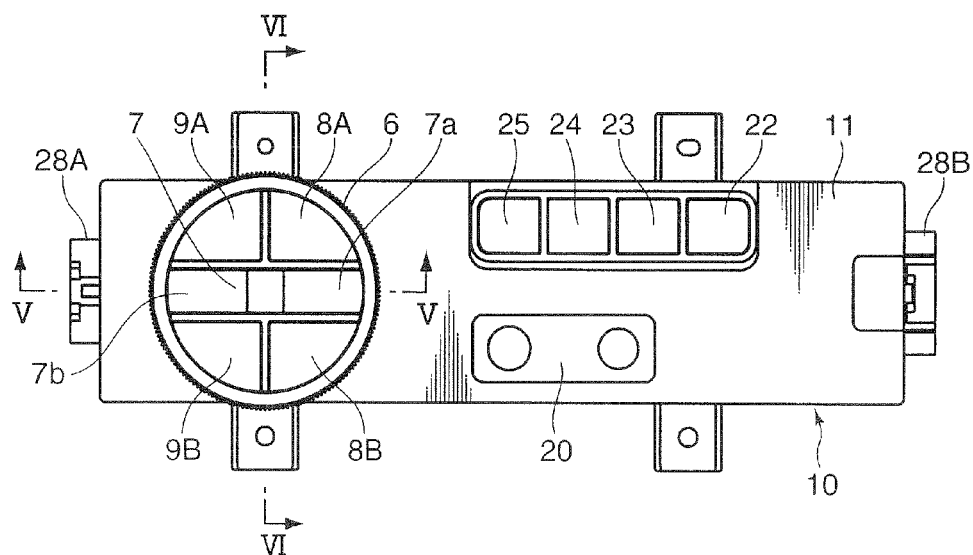
FIG. 1B is a top plan view of the power seat control unit.
Figure 2A:
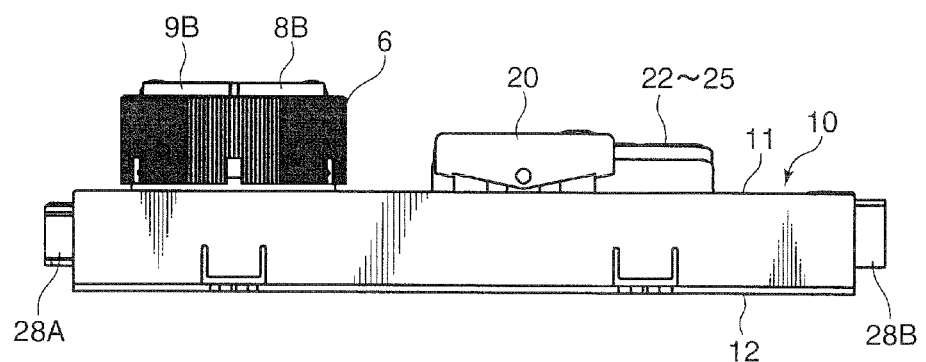
FIG. 2A is a front view of the power seat control unit in FIG. 1A.
Figure 2B:
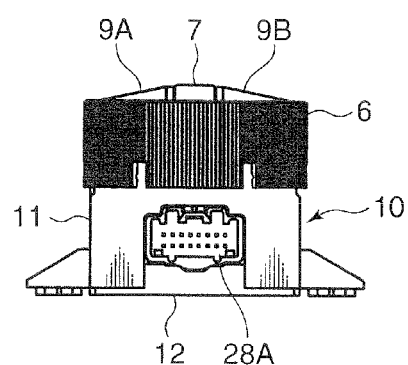
FIG. 2B is a left side view of the power seat control unit in FIG. 1A.

In an internal space of the dial-type manual operation switch knob 6, the seesaw-type manual operation switch knob 7 occupies a region which has a generally rectangular shape elongated in a frontward-rearward direction and extends across the center of the dial-type manual operation switch knob 6 (see FIG. 1B). In the internal space, two given spaces are defined on respective ones of both sides of and across the seesaw-type manual operation switch knob 7.

In the internal space of the dial-type manual operation switch knob 6, the button-type manual operation switch knobs 8A, 8B, 9A, 9B are disposed in the two spaces on the both sides of the seesaw-type manual operation switch knob 7. In other words, the button-type manual operation switch knobs 8A, 8B, 9A, 9B are disposed in respective ones of generally triangular corner regions defined by dividing the two spaces between the dial-type manual operation switch knob 6 and the seesaw-type manual operation switch knob 7 equally into four spaces. As shown in FIG. 6, a pair of upper and lower connection members 41a, 41b similar to the upper and lower connection members 40a, 40b are interposed between each of the button-type manual operation switch knobs 8A, 8B, 9A, 9B and a corresponding one of the push switches 16A, 16B, 17A, 17B.

When the button-type manual operation switch knob 8A is manually pushed, the push switch 16A for the tilt-up adjustment is turned on through the upper and lower connection members 41a, 41b, etc. Thus, the actuator is driven to displace the front portion of the seat cushion 2 upwardly. When the button-type manual operation switch knob 8B is manually pushed, the push switch 16B for the tilt-down adjustment is turned on through the upper and lower connection members 41a, 41b, etc. Thus, the actuator is driven to displace the front portion of the seat cushion 2 downwardly.

When the button-type manual operation switch knob 9A is manually pushed, the push switch 17A for the lift-up adjustment is turned on through the upper and lower connection members 41a, 41b, etc. Thus, the actuator is driven to displace the rear portion of the seat cushion 2 upwardly. When the button-type manual operation switch knob 9B is manually pushed, the push switch 17B for the lift-down adjustment is turned on through the upper and lower connection members 41a, 41b, etc. Thus, the actuator is driven to displace the rear portion of the seat cushion 2 downwardly.

As shown in FIG. 5, an upper surface of the seesaw-type manual operation switch knob 7 is has a central region defined by the central portion and front and rear regions defined by the front portion 7a and the rear portion 7b, wherein the central region is formed in a concaved shape depressed relative to the front and rear regions, and each of the front and rear regions inclinedly extends from the central region in such a manner that an end thereof is located above a top end 6c of the dial-type manual operation switch knob 6 by a heightwise distance indicated by the code g in FIG. 5.

As shown in FIG. 6, an upper surface of each of the button-type manual operation switch knobs 8A, 8B, 9A, 9B is formed in an inclined shape. Specifically, the upper surface of each of the button-type manual operation switch knobs 8A, 8B, 9A, 9B is formed such that a first edge h along the seesaw-type manual operation switch knob 7 is located at approximately the same height position as that of the ends of the seesaw-type manual operation switch knob 7. Further, the upper surface of each of the button-type manual operation switch knobs 8A, 8B, 9A, 9B is formed such that a second edge i along the dial-type manual operation switch knob 6 is located at approximately the same height position as that of the top end 6c of the dial-type manual operation switch knob 6.

In the above power seat control unit, when the dial-type manual operation switch knob 6 is rotated in the first direction (clockwise direction), the turnable plate 35 is also turned in the first direction through the downwardly-extending protrusion 6b and the concave portion 35b, and then the lower piece 35c of the turnable plate 35 pushes the first end portion 36a of the swing plate 36 downwardly. Thus, the push switch 14A for the frontward inclining adjustment is turned on, so that the actuator is driven to incline the seat back 3 frontwardly (in the direction indicated by the arrowed line A in FIG. 7). In this manner, the reclining adjustment of the seat back 3 can be performed. When the dial-type manual operation switch knob 6 is rotated in the second direction (counterclockwise direction), the lower piece 35c of the turnable plate 35 pushes the second end portion 36b of the swing plate 36 downwardly. Thus, the push switch 14B for the rearward inclining adjustment is turned on, so that the actuator is driven to incline the seat back 3 rearwardly (in the direction indicated by the arrowed line A in FIG. 7). In this manner, the reclining adjustment of the seat back 3 can be performed.

When the front portion 7a of the seesaw-type manual operation switch knob 7 is pushed, the push switch 15A for the frontward displacement adjustment is turned on through the connection members 40a, 40b, etc. Thus, the actuator is driven to displace the seat 1 in the direction indicated by the arrowed line B in FIG. 7 (frontwardly). In this manner, the slide adjustment of the seat 1 can be performed. When the rear portion 7b of the seesaw-type manual operation switch knob 7 is pushed, the push switch 15B for the rearward displacement adjustment is turned on in the same manner. Thus, the seat 1 is displaced in the direction indicated by the arrowed line B in FIG. 7 (rearwardly) according to driving of the actuator. In this manner, the slide adjustment of the seat 1 can be performed.

When the button-type manual operation switch knob 8A is pushed, the push switch 16A for the tilt-up adjustment is turned on through the connection members 41a, 41b, etc. Thus, the actuator is driven to displace the front portion of the seat cushion 2 upwardly (in the direction indicated by the arrowed line C in FIG. 7). In this manner, the tilt adjustment of the seat cushion 2 can be performed. When the button-type manual operation switch knob 8B is pushed, the push switch 16B for the tilt-down adjustment is turned on. Thus, the actuator is driven to displace the front portion of the seat cushion 2 downwardly (in the direction indicated by the arrowed line C in FIG. 7). In this manner, the tilt adjustment of the seat cushion 2 can be performed.

When the button-type manual operation switch knob 9A is pushed, the push switch 17A for the lift-up adjustment is turned on through the connection members 41a, 41b, etc. Thus, the actuator is driven to displace the rear portion of the seat cushion 2 upwardly (in the direction indicated by the arrowed line D in FIG. 7). In this manner, the lift adjustment of the seat 1 can be performed. When the button-type manual operation switch knob 9B is pushed, the push switch 17B for the lift-down adjustment is turned on. Thus, the actuator is driven to displace the rear portion of the seat cushion 2 downwardly (in the direction indicated by the arrowed line D in FIG. 7).

In this manner, the lift adjustment of the seat 1 can be performed.

In the power seat control unit according to this embodiment, the dial-type manual operation switch knob 6 is provided as a switch knob for the reclining adjustment, and the seesaw-type manual operation switch knob 7 is provided as a switch knob for the slide adjustment. Further, each of the button-type manual operation switch knobs 8A, 8B, 9A, 9B is provided as a switch knob for the tilt or lift adjustment. In other words, three types of switch knobs are prepared as a manual operation switch knob, and the seesaw-type manual operation switch knob 7 and the button-type manual operation switch knobs 8A, 8B, 9A, 9B are disposed on the inward side of the dial-type manual operation switch knob 6.

Thus, even in a situation where a seat occupant gropingly operates each of the manual operation switch knobs 6, 7, 8A, 8B, 9A, 9B, the dial-type manual operation switch knob 6 can be easily found in a sensory manner, so that the manual operation of the dial-type manual operation knob can be performed without confusion.

As above, the manual operation switch knob 6 for the reclining adjustment which is performed relatively frequently, and a group of the manual operation switch knobs 7, 8A, 8B, 9A, 9B for the slide, tilt and lift adjustments which are performed only occasionally, are separately disposed and clearly sectionalized, so that operationality of the reclining adjustment which is performed relatively frequently, can be enhanced.

In addition, the manual operation switch knobs 8A, 8B, 9A, 9B are formed in a different knob type from that of the manual operation switch knob 6, so that the manual operation of each of the manual operation switch knobs 8A, 8B, 9A, 9B which are performed only occasionally can be performed with less confusion.

Further, each of the eight switches 14A to 17B corresponding to respective ones of the manual operation switch knobs 6, 7, 8A, 8B, 9A, 9B for the frontward and rearward inclining adjustments (reclining adjustment), the frontward and rearward displacement adjustments (slide adjustment), the tilt-up and tilt-down adjustments (tilt adjustment) and the lift-up and lift-down adjustments (lift adjustment), and other total six switched consisting of the switches 21A, 21B for the frontward and rearward displacement adjustments of the lumber support, and the switches 22A to 25A for storage of data, such as a slide position, can be composed of a general-purpose low-cost push (tact) switch.

Further, the seesaw-type manual operation switch knob 7 is formed such that the upper surface thereof is inclined to have the concaved central region, and the opposite end regions each located above the top end 6c of the dial-type manual operation switch knob 6, and each of the button-type manual operation switch knobs 8A, 8B, 9A, 9B is formed such that the upper surface thereof is inclined to have the first edge h located along the seesaw-type manual operation switch knob 7 at approximately the same height position as that of the end regions of the upper surface of the seesaw-type manual operation switch knob 7, and the second edge i located along the dial-type manual operation switch knob 6 at approximately the same height position as that of the top end 6c of the dial-type manual operation switch knob 6.

Thus, even in a situation where a seat occupant gropingly operates each of the manual operation switch knobs 7, 8A, 8B, 9A, 9B, respective inclination directions of the upper surface of the seesaw-type manual operation switch knob 7 (one surface of the seesaw-type manual operation switch knob 7 on an opposite side of the other surface facing the seat), and the upper surface of each of the button-type manual operation switch knobs 8A, 8B, 9A, 9B (one surface of each of the button-type manual operation switch knobs 8A, 8B, 9A, 9B on an opposite side of the other surface facing the seat) can be easily recognized even by hand feeling, so that the manual operation of each of the manual operation switch knobs 7, A, 8B, 9A, 9B for the slide, tilt and left adjustments which are performed only occasionally, can be performed with less confusion.

Summary of Embodiment

The above embodiment can be summarized as follows.

(1) In the above embodiment, a dial-type manual operation switch knob is provided as a switch knob for a reclining adjustment, and a seesaw-type manual operation switch knob is provided as a switch knob for a slide adjustment. Further, a plurality of button-type manual operation switch knobs are provided as switch knobs for tilt and lift adjustments. In other words, three types of switch knobs are provided as the manual operation switch knobs. In addition, the seesaw-type manual operation switch knob and the button-type manual operation switch knobs are disposed on an inward side of the dial-type manual operation switch knob. Thus, even in a situation where a seat occupant gropingly operates each of the manual operation switch knobs, the dial-type manual operation switch knob can be easily found in a sensory manner, so that the manual operation of the dial-type manual operation knob can be performed without confusion.

As above, the manual operation switch knob for the reclining adjustment which is performed relatively frequently, and a group of the manual operation switch knobs for the slide, tilt and lift adjustments which are performed only occasionally, are separately disposed and clearly sectionalized, so that operationality of the reclining adjustment which is performed relatively frequently, can be enhanced.

In addition, the manual operation switch knobs for the slide, tilt and lift adjustments are formed in a different knob type from that of the manual operation switch knob for the reclining adjustment, so that the manual operation of each of the manual operation switch knobs 8A, 8B, 9A, 9B for the slide, tilt and lift adjustments which are performed only occasionally, can be performed with less confusion.

(2) Preferably, the above power seat control unit comprises a combination of a push switch for a frontward inclining adjustment and a push switch for a rearward inclining adjustment each adapted to be turned on depending on a rotation direction of the dial-type manual operation switch knob, a combination of a push switch for a frontward displacement adjustment and a push switch for a rearward displacement adjustment each adapted to be turned on depending on a pushed position of the seesaw-type manual operation switch knob, and a combination of a push switch for a tilt-up adjustment, a push switch for a tilt-down adjustment, a push switch for a lift-up adjustment, and a push switch for a lift-down adjustment each adapted to be turned on depending on which of the button-type manual operation switch knobs is pushed.

In this case, each of the eight switches corresponding to respective ones of the manual operation switch knobs for the frontward and rearward inclining adjustments (reclining adjustment), the frontward and rearward displacement adjustments (slide adjustment), the tilt-up and tilt-down adjustments (tilt adjustment) and the lift-up and lift-down adjustments (lift adjustment), and other total six switched consisting of switches for frontward and rearward displacement adjustments of a lumber support, and switches for storage of data, such as a slide position, can be composed of a general-purpose low-cost push (tact) switch.

(3) Preferably, in the above the above power seat control unit, the seesaw-type manual operation switch knob is formed such that an upper surface thereof is inclined to have a concaved central region, and opposite end regions each located above a top end of the dial-type manual operation switch knob, and each of the button-type manual operation switch knobs is formed such that an upper surface thereof is inclined to have a first edge located along the seesaw-type manual operation switch knob at approximately the same height position as that of the end regions of the upper surface of the seesaw-type manual operation switch knob, and a second edge located along the dial-type manual operation switch knob at approximately the same height position as that of the top end of the dial-type manual operation switch knob.

In this case, even in a situation where a seat occupant gropingly operates each of the manual operation switch knobs, respective inclination directions of the upper surface of the seesaw-type manual operation switch knob, and the upper surface of each of the button-type manual operation switch knobs can be easily recognized even by hand feeling, so that the manual operation of each of the manual operation switch knobs for the slide, tilt and left adjustments which are performed only occasionally, can be performed with less confusion.

This application is based on Japanese Patent Application Serial No. 2009-024492 filed in Japan Patent Office on Feb. 5, 2009, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A power seat control unit for allowing a seat occupant to perform reclining, slide, tilt and lift adjustments of a power seat, comprising:
   a dial-type manual operation switch knob for a reclining adjustment of a seat back of the seat, the dial-type manual operation switch knob being formed in a ring shape, and adapted to allow the seat occupant to selectively perform a frontward inclining adjustment and a rearward inclining adjustment of the seat back of the seat, depending on a rotation direction thereof;
   a seesaw-type manual operation switch knob for a slide adjustment, the seesaw-type manual operation switch knob being disposed on an inward side of the dial-type manual operation switch knob and across a center of the dial-type manual operation switch knob, and adapted to allow the seat occupant to selectively perform a frontward displacement adjustment and a rearward displacement adjustment of the seat, depending on a pushed position thereof; and
   a plurality of button-type manual operation switch knobs for tilt and lift adjustments, the plurality of button-type manual operation switch knobs being disposed on the inward side of the dial-type manual operation switch knob and on both sides of the seesaw-type manual operation switch knob, and adapted to allow the seat occupant to selectively perform a tilt-up adjustment and a tilt-down adjustment of a front portion of a seat cushion of the seat, and a lift-up adjustment and a lift-down adjustment of a rear portion of the seat cushion, depending on which of the button-type manual operation switch knobs is pushed.

2. The power seat control unit according to claim 1, which further comprises:
   a combination of a push switch for the frontward inclining adjustment and a push switch for the rearward inclining adjustment each adapted to be turned on depending on the rotation direction of the dial-type manual operation switch knob;
   a combination of a push switch for the frontward displacement adjustment and a push switch for the rearward displacement adjustment each adapted to be turned on depending on a pushed position of the seesaw-type manual operation switch knob; and
   a combination of a push switch for the tilt-up adjustment, a push switch for the tilt-down adjustment, a push switch for the lift-up adjustment, and a push switch for the lift-down adjustment each adapted to be turned on depending on which of the button-type manual operation switch knobs is pushed.

3. The power seat control unit according to claim 2, wherein:
   the seesaw-type manual operation switch knob is formed such that an upper surface thereof is inclined to have a concaved central region, and opposite end regions each located above a top end of the dial-type manual operation switch knob; and
   each of the button-type manual operation switch knobs is formed such that an upper surface thereof is inclined to have a first edge located along the seesaw-type manual operation switch knob at approximately the same height position as that of the end regions of the upper surface of the seesaw-type manual operation switch knob, and a second edge located along the dial-type manual operation switch knob at approximately the same height position as that of the top end of the dial-type manual operation switch knob.

4. The power seat control unit according to claim 1, wherein:
   the seesaw-type manual operation switch knob is formed such that an upper surface thereof is inclined to have a concaved central region, and opposite end regions each located above a top end of the dial-type manual operation switch knob; and
   each of the button-type manual operation switch knobs is formed such that an upper surface thereof is inclined to have a first edge located along the seesaw-type manual operation switch knob at approximately the same height position as that of the end regions of the upper surface of the seesaw-type manual operation switch knob, and a second edge located along the dial-type manual operation switch knob at approximately the same height position as that of the top end of the dial-type manual operation switch knob.

* * * * *